(12) United States Patent
Shavit

(10) Patent No.: US 10,521,825 B2
(45) Date of Patent: Dec. 31, 2019

(54) SYSTEMS AND METHODS FOR PROVIDING INTERACTIVE USER INTERFACE ELEMENTS FOR OBTAINING FEEDBACK WITHIN A MEDIA CONTENT ITEM

(71) Applicant: Facebook, Inc., Menlo Park, CA (US)

(72) Inventor: Eithan Shavit, San Bruno, CA (US)

(73) Assignee: Facebook, Inc., Menlo Park, CA (US)

(*) Notice: Subject to any disclaimer, the term of this patent is extended or adjusted under 35 U.S.C. 154(b) by 55 days.

(21) Appl. No.: 15/460,190

(22) Filed: Mar. 15, 2017

(65) Prior Publication Data

US 2018/0267674 A1 Sep. 20, 2018

(51) Int. Cl.
*G06F 3/048* (2013.01)
*G06Q 30/02* (2012.01)
*G06Q 50/00* (2012.01)

(52) U.S. Cl.
CPC ......... *G06Q 30/0269* (2013.01); *G06Q 50/01* (2013.01)

(58) Field of Classification Search
CPC .......... G06F 3/0482; G06F 3/048; G06F 5/16; G06Q 30/0203
See application file for complete search history.

(56) References Cited

U.S. PATENT DOCUMENTS

| 6,934,965 B2* | 8/2005 | Gordon | H04N 5/44543 |
| | | | 348/E5.104 |
| 9,230,355 B1* | 1/2016 | Ahuja | G06T 11/60 |
| 2002/0072955 A1* | 6/2002 | Brock | G06Q 30/02 |
| | | | 715/758 |
| 2012/0079380 A1* | 3/2012 | Tsai | G06F 17/30017 |
| | | | 715/716 |
| 2012/0290979 A1* | 11/2012 | Devecka | H04W 4/21 |
| | | | 715/810 |
| 2012/0310750 A1* | 12/2012 | Schutzbank | G06Q 30/02 |
| | | | 705/14.72 |
| 2013/0204664 A1* | 8/2013 | Romagnolo | G06Q 30/0203 |
| | | | 705/7.32 |
| 2013/0265450 A1* | 10/2013 | Barnes, Jr. | H04N 5/77 |
| | | | 348/207.1 |
| 2014/0095608 A1* | 4/2014 | Mandalia | G06F 17/30038 |
| | | | 709/204 |
| 2015/0058239 A1* | 2/2015 | Lenahan | G06Q 30/0631 |
| | | | 705/319 |
| 2015/0120389 A1* | 4/2015 | Zhang | G06Q 10/10 |
| | | | 705/7.32 |
| 2015/0244747 A1* | 8/2015 | Wickenkamp | G06F 3/0482 |
| | | | 726/28 |
| 2018/0096382 A1* | 4/2018 | Maughan | G06Q 30/0246 |

* cited by examiner

*Primary Examiner* — Thanh T Vu
(74) *Attorney, Agent, or Firm* — Sheppard Mullin Richter & Hampton LLP

(57) ABSTRACT

Systems, methods, and non-transitory computer readable media can determine a set of interactive user interface (UI) elements, each interactive UI element associated with at least one of: a particular feedback or an entity. A media content item created by a first user can be provided, where the media content item includes a subset of the set of interactive UI elements selected by the first user. A selection of at least one interactive UI element in the subset in the media content item by a second user can be obtained.

20 Claims, 12 Drawing Sheets

500

Obtain feedback associated with a media content item from a plurality of users, wherein the feedback is indicated by selection of at least one interactive UI element in a subset of a set of interactive UI elements included in the media content item by each of the plurality of users
502

Provide aggregated data relating to the feedback obtained from the plurality of users
504

FIGURE 5

SYSTEMS AND METHODS FOR PROVIDING INTERACTIVE USER INTERFACE ELEMENTS FOR OBTAINING FEEDBACK WITHIN A MEDIA CONTENT ITEM

FIELD OF THE INVENTION

The present technology relates to the field of social networks. More particularly, the present technology relates to techniques for providing interactive user interface elements within media content items.

BACKGROUND

Today, people often utilize computing devices (or systems) for a wide variety of purposes. Users can use their computing devices, for example, to interact with one another, create content, share content, and view content. In some cases, a user can utilize his or her computing device to access a social networking system (or service). The user can provide, post, share, and access various content items, such as status updates, images, videos, articles, and links, via the social networking system. Users can create posts within the social networking system. Posts can be presented on profile pages of users. Posts can also be presented through feeds for users, such as newsfeed.

SUMMARY

Various embodiments of the present disclosure can include systems, methods, and non-transitory computer readable media configured to determine a set of interactive user interface (UI) elements, each interactive UI element associated with at least one of: a particular feedback or an entity. A media content item created by a first user can be provided, where the media content item includes a subset of the set of interactive UI elements selected by the first user. A selection of at least one interactive UI element in the subset in the media content item by a second user can be obtained.

In some embodiments, the set of interactive UI elements is associated with one or more of: emojis, images, or animations.

In certain embodiments, an interactive UI element includes one or more of: a button, a link, a tab, an image, or an icon.

In an embodiment, feedback associated with the media content item from the second user can be obtained, wherein the feedback is indicated by the at least one interactive UI element in the subset selected by the second user.

In some embodiments, the obtained feedback can be provided to the first user.

In certain embodiments, feedback associated with the media content item from a plurality of users can be obtained, wherein the feedback is indicated by selection of at least one interactive UI element in the subset by each of the plurality of users, and aggregated data relating to the feedback obtained from the plurality of users can be provided.

In an embodiment, an action associated with the at least one interactive UI element in the subset selected by the second user can be executed, wherein the at least one interactive UI element is associated with an entity.

In some embodiments, the action includes providing one or more of: information associated with the entity, a call-to-action (CTA) associated with the entity, a discount, a coupon, or a workflow associated with the entity.

In certain embodiments, an incentive associated with the entity is provided to at least one of the first user or the second user, wherein the incentive is provided to the first user in response to selection of the at least one interactive UI element for the subset by the first user and the incentive is provided to the second user in response to the selection of the at least one interactive UI element by the second user.

In an embodiment, the subset is embedded within the media content item.

It should be appreciated that many other features, applications, embodiments, and/or variations of the disclosed technology will be apparent from the accompanying drawings and from the following detailed description. Additional and/or alternative implementations of the structures, systems, non-transitory computer readable media, and methods described herein can be employed without departing from the principles of the disclosed technology.

BRIEF DESCRIPTION OF THE DRAWINGS

FIG. 5 illustrates an example second method for providing interactive user interface elements within media content items, according to an embodiment of the present disclosure.

Figure 1:
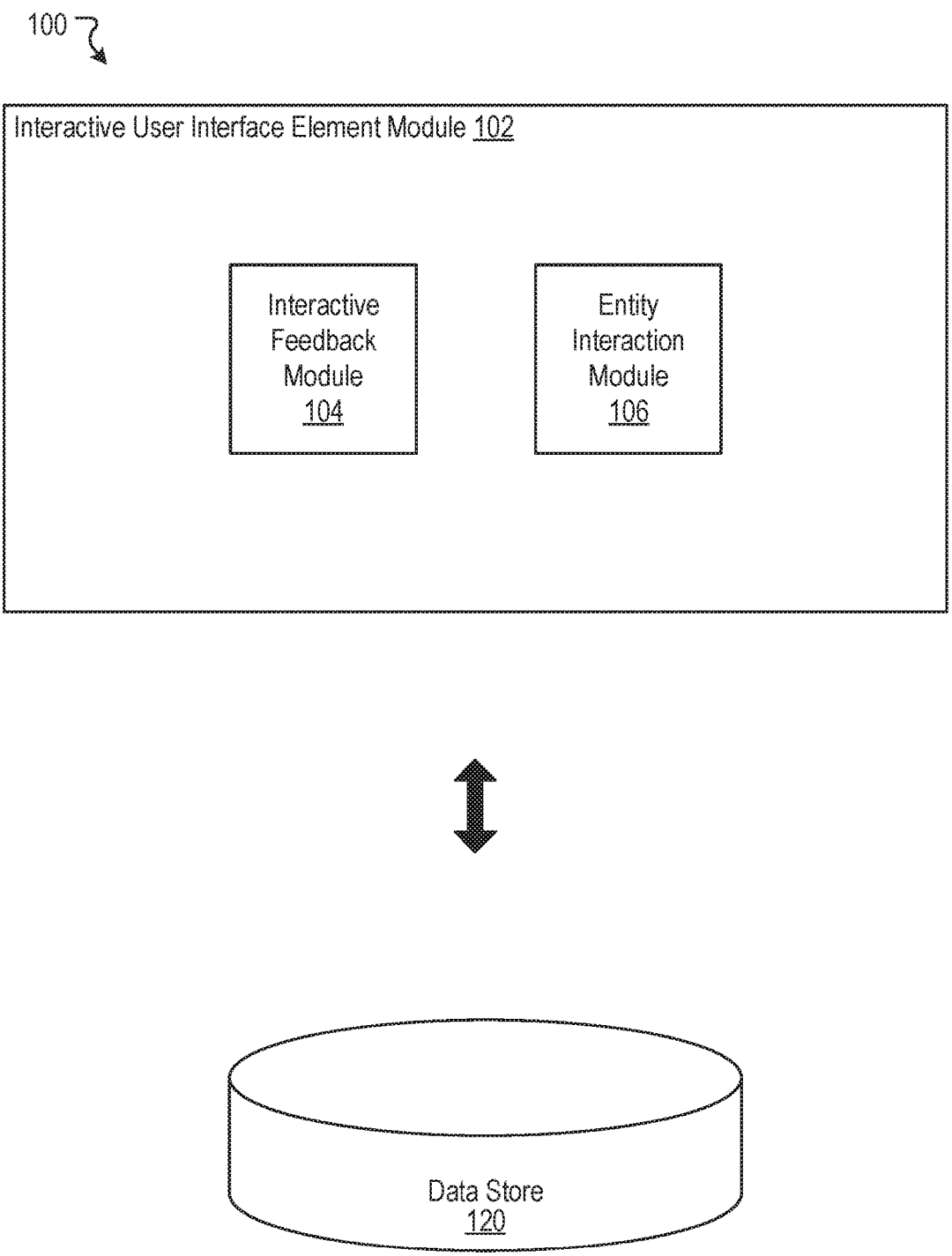
FIG. 1 illustrates an example system including an example interactive user interface element module configured to provide interactive user interface elements within media content items, according to an embodiment of the present disclosure.

The figures depict various embodiments of the disclosed technology for purposes of illustration only, wherein the figures use like reference numerals to identify like elements. One skilled in the art will readily recognize from the following discussion that alternative embodiments of the structures and methods illustrated in the figures can be employed without departing from the principles of the disclosed technology described herein.

DETAILED DESCRIPTION

Providing Interactive User Interface Elements for Obtaining Feedback Within a Media Content Item People use computing devices (or systems) for a wide variety of purposes. Computing devices can provide different kinds of functionality. Users can utilize their computing devices to produce information, access information, and share information. In some cases, users can utilize computing devices to interact or engage with a conventional social networking system (e.g., a social networking service, a social network, etc.). A social networking system may provide user profiles for various users through which users may add connections, such as friends, or publish content items. Users can create posts within the social networking system. Posts can be presented on profile pages of users. Posts can also be presented through feeds for users, such as newsfeed.

There can be various types of applications associated with a social networking system, such a social networking application, a messaging or a chat application, a photo sharing application, etc. Users can create posts and/or provide feedback associated with posts within an application. A post can include a media content item, such as an image, a video, etc. Under conventional approaches specifically arising in the realm of computer technology, users can provide feedback associated with a post or a media content item included in the post by liking the post, commenting on the post, sharing the post, etc. For example, a user can comment on a post by entering text as feedback. However, such feedback is generally separate from and is not directly integrated with any media content item included in a post. For example, a mechanism for providing feedback associated with a media content item in a post may not be accessible from within the media content item itself.

An improved approach rooted in computer technology can overcome the foregoing and other disadvantages associated with conventional approaches specifically arising in the realm of computer technology. Based on computer technology, the disclosed technology can provide interactive user interface (UI) elements for obtaining feedback within media content items. An interactive UI element can include any type of element that can be included within a media content item in order to obtain feedback from a user. Examples of interactive UI elements can include buttons, links, tabs, images, icons, etc. An application can include a tool that provides one or more interactive UI elements that can be included in a media content item. In some embodiments, interactive UI elements can be associated with emojis. A user who creates a media content item ("authoring user") can add one or more interactive UI elements provided by the tool to a media content item in order to obtain feedback. For example, an authoring user can include a question within a media content item and select one or more interactive UI elements as possible responses to the question. Each interactive UI element included in a media content item can be indicative of a particular response to the question. The one or more interactive UI elements can become integrated within the media content item. A user who views or consumes the media content item ("viewing user") can then select one or more of the possible responses provided within the media content item as feedback, and the feedback can be provided to the authoring user. For example, feedback from viewing users can be aggregated and provided to the authoring user. The disclosed technology can also provide interactive UI elements associated with entities within media content items. For example, an application running on a user computing device can include a tool that provides one or more interactive UI elements associated with entities that can be included in a media content item. Similar to interactive UI elements for obtaining feedback, an authoring user can add one or more interactive UI elements associated with entities to a media content item. If a viewing user selects an interactive UI element associated with an entity, various actions and/or functions can be performed or executed. For example, information and/or content associated with an entity can be presented to a viewing user. In this manner, the disclosed technology can incorporate an interactive feedback mechanism within a media content item itself as well as incorporate interactions associated with an entity within a media content item. The disclosed technology can provide an interesting and engaging way for users to interact with content. Details relating to the disclosed technology are explained below.

FIG. 1 illustrates an example system 100 including an example interactive user interface element module 102 configured to provide interactive feedback user interface elements within media content items, according to an embodiment of the present disclosure. The interactive user interface element module 102 can include an interactive feedback module 104 and an entity interaction module 106. In some instances, the example system 100 can include at least one data store 120. The components (e.g., modules, elements, steps, blocks, etc.) shown in this figure and all figures herein are exemplary only, and other implementations may include additional, fewer, integrated, or different components. Some components may not be shown so as not to obscure relevant details. In various embodiments, one or more of the functionalities described in connection with the interactive user interface element module 102 can be implemented in any suitable combinations. For illustrative purposes, the disclosed technology is described in connection with a social networking system and/or application, but the disclosed technology can apply to any type of system and/or application.

The interactive feedback module 104 can provide interactive UI elements for obtaining feedback within media content items. Examples of a media content item can include an image, a video, etc. A media content item can be included in a post. Posts can be organized under a story for a user. For example, a story can present content associated with a specific user and can include one or more posts of the user. In some embodiments, a story can act as a container for posts of a user. Posts may also be referred to as chapters. In some embodiments, posts and/or any content included in posts can be ephemeral and expire after a period of time (e.g., second(s), minute(s), hour(s), day(s), etc.). Functionality of the interactive feedback module 104 is described in more detail herein.

The entity interaction module 106 can provide interactive UI elements associated with entities within media content items. Examples of entities can include organizations, companies, businesses, brands, products, artists, public figures, entertainment, individuals, etc. Various actions and/or functions can be associated with interactive UI elements associated with entities. Functionality of the entity interaction module 106 is described in more detail herein.

In some embodiments, the interactive user interface element module 102 can be implemented, in part or in whole, as software, hardware, or any combination thereof. In general, a module as discussed herein can be associated with software, hardware, or any combination thereof. In some implementations, one or more functions, tasks, and/or operations of modules can be carried out or performed by software routines, software processes, hardware, and/or any combination thereof. In some cases, the interactive user interface element module 102 can be, in part or in whole, implemented as software running on one or more computing devices or systems, such as on a server system or a client computing device. In some instances, the interactive user interface element module 102 can be, in part or in whole, implemented within or configured to operate in conjunction or be integrated with a social networking system (or service), such as a social networking system 630 of FIG. 6. Likewise, in some instances, the interactive user interface element module 102 can be, in part or in whole, implemented within or configured to operate in conjunction or be integrated with a client computing device, such as the user device 610 of FIG. 6. For example, the interactive user interface element module 102 can be implemented as or within a dedicated application (e.g., app), a program, or an applet running on a user computing device or client computing system. It should be understood that many variations are possible.

The data store 120 can be configured to store and maintain various types of data, such as the data relating to support of and operation of the interactive user interface element module 102. The data maintained by the data store 120 can include, for example, information relating to interactive UI elements (e.g., interactive UI elements associated with obtaining feedback, interactive UI elements associated with entities, etc.), posts, media content items, entities, feedback associated with media content items, interactions associated with entities, stories, etc. The data store 120 also can maintain other information associated with a social networking system. The information associated with the social networking system can include data about users, social connections, social interactions, locations, geo-fenced areas, maps, places, events, groups, posts, communications, content, account settings, privacy settings, and a social graph. The social graph can reflect all entities of the social networking system and their interactions. As shown in the example system 100, the interactive user interface element module 102 can be configured to communicate and/or operate with the data store 120. In some embodiments, the data store 120 can be a data store within a client computing device. In some embodiments, the data store 120 can be a data store of a server system in communication with the client computing device.

Figure 2A:
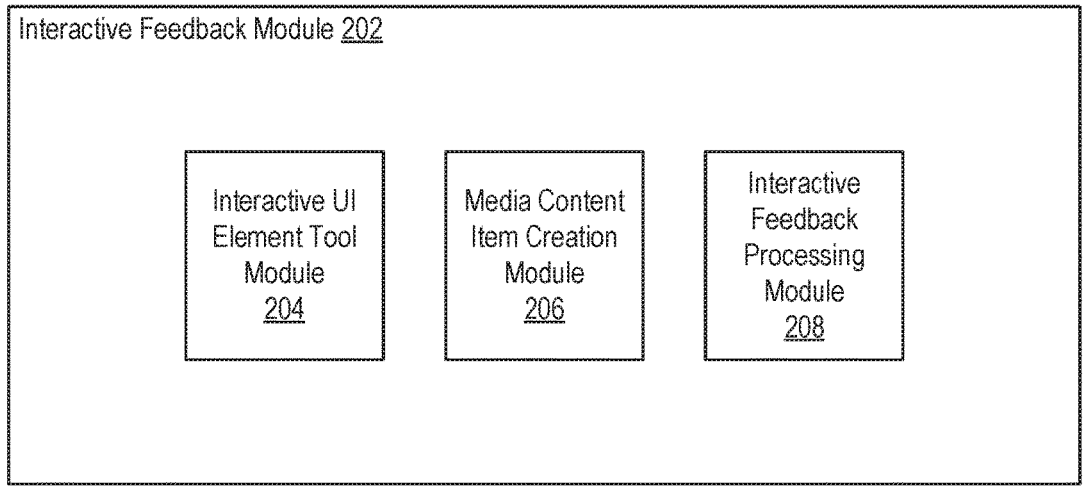
FIG. 2A illustrates an example interactive feedback module configured to provide interactive user interface elements for obtaining feedback within media content items, according to an embodiment of the present disclosure.

FIG. 2A illustrates an example interactive feedback module 202 configured to provide interactive user interface elements for obtaining feedback within media content items, according to an embodiment of the present disclosure. In some embodiments, the interactive feedback module 104 of FIG. 1 can be implemented with the example interactive feedback module 202. As shown in the example of FIG. 2A, the example interactive feedback module 202 can include an interactive UI element tool module 204, a media content item creation module 206, and an interactive feedback processing module 208.

The interactive UI element tool module 204 can provide a tool including one or more interactive UI elements for obtaining feedback. An application running on a computing device of an authoring user can provide a tool that includes a set of interactive UI elements that can be added to a media content item. An authoring user can access the tool and add one or more interactive UI elements to the authoring user's media content item. For example, the tool can be accessed by selecting an icon presented through a user interface of the application. An interactive UI element can include any type of element that can be included within a media content item in order to obtain feedback from a user. Examples of interactive UI elements can include buttons, links, tabs, images, icons, etc. In some embodiments, interactive UI elements can be associated with different emojis. Emojis can be a convenient way for users to provide feedback. Each interactive UI element can be associated with an emoji. For example, a first interactive UI element can be associated with a thumbs-up emoji and a second interactive UI element can be associated with a thumbs-down emoji. An emoji can be associated with a positive, neutral, or negative sentiment. Different emojis may convey varying degrees of a particular sentiment. For example, a heart emoji can convey a stronger degree of liking something than a smiley face emoji. Examples of emojis can include smiley face, thumbs-up, thumbs-down, ok, clap, heart, angry face, etc. In other embodiments, interactive UI elements can be associated with other types of data that indicate feedback, such as images, animations, etc. Any number of interactive UI elements can be included in the tool as appropriate. Interactive UI elements may be organized in multiple panels that can be scrolled through depending on the number of interactive UI elements. In certain embodiments, the set of interactive UI elements can be determined based on machine learning techniques, research, etc. For example, users may use certain emojis more frequently than other emojis, and the more frequently used emojis can be provided by the tool. In some embodiments, a standard set of interactive UI elements can be provided to all users. In other embodiments, a customized set of interactive UI elements can be provided to an individual user, groups of users, etc. Interactive UI elements included in the tool can be determined server-side such that interactive UI elements included in the tool can change dynamically.

The media content item creation module 206 can create media content items including one or more interactive UI elements associated with feedback. An authoring user can create a media content item. As mentioned above, a media content item can be included in a post. The authoring user can include one or more questions or other content within the media content item for which the user wants to obtain feedback. A question can be presented in various formats (e.g., text, image, audio, etc.). For example, the authoring user can include an image of shoes the user is interested in purchasing and add a text question "get these shoes?" in the image. In some cases, the question may be conveyed by content of a media content item and may not be stated expressly. For example, an image of a product can convey that the authoring user is asking for feedback on the product. The authoring user can determine one or more interactive UI elements as potential responses or feedback options to the authoring user's question. The authoring user can add the one or more interactive UI elements to the media content item. For example, the authoring user can include a thumbs-up emoji to indicate a positive feedback option and a thumbs-down emoji to indicate a negative feedback option. The authoring user can access the tool and add interactive UI elements to the media content item by selection (e.g., a click, a touch gesture, etc.), drag and drop, etc. The authoring user can determine placement and/or appearance of added interactive UI elements within the media content item. For example, the added interactive UI elements can appear in default positions within the media content item, and the authoring user can move the added interactive UI elements from the default positions to desired positions within the media content item. The authoring user can also alter or manipulate the added interactive UI elements in various ways, for example, by resizing, rotating, changing proportions, changing colors, changing shapes, etc. Many variations are possible. Once interactive UI elements are added to a media content item, the interactive UI elements can be embedded within the media content item itself and can become an integrated part of the media content item. When the media content item is presented to viewing users, the added interactive UI elements are presented as a part of the media content item. In certain embodiments, added interactive UI elements may not be embedded within the media content item itself, but can be added to the media content item in a layer, as metadata.

The interactive feedback processing module 208 can receive feedback indicated by one or more interactive UI elements. A viewing user can access a media content item including one or more interactive UI elements through a user interface of an application running on a computing device of the viewing user and, through the user interface, provide feedback for a question from the authoring user of the media content item. For example, the viewing user can select (e.g., by a click, a touch gesture, etc.) one or more of the interactive UI elements in the media content item. In some embodiments, only one interactive UI element can be selected by a viewing user. In other embodiments, multiple interactive UI elements can be selected by a viewing user. For example, a question can request a viewing user to select all interactive UI elements that apply. A visual indication can be provided to a viewing user that a particular interactive UI element has been selected by the viewing user. For example, if interactive UI elements are buttons, selected buttons can be distinguished from unselected buttons to indicate that they have been selected (e.g., by highlight, color, shadow, etc.). When one or more interactive UI elements are selected by a viewing user through a user interface of an application running on a computing device of the viewing user, a server in communication with the computing device can receive feedback indicated by the selected interactive UI elements.

Feedback from viewing users can be obtained and, through communication between the server and an application running on a computing device of the authoring user, provided to the authoring user. Feedback from viewing users can be processed in various ways. For example, feedback from viewing users can be aggregated, summarized, etc. Various metrics can be determined in association with feedback from viewing users. Obtained and/or processed feedback can be provided to the authoring user, for example, in association with the media content item. For instance, the authoring user can access feedback associated with the media content item by accessing a post including the media content item. Notifications may be sent to the authoring user as feedback is obtained. In some embodiments, feedback associated with the media content item can be visible only to the authoring user. In other embodiments, feedback associated with the media content item may also be visible to other users. Data relating to feedback from viewing users can be stored for a period of time (e.g., second(s), minute(s), day(s), month(s), etc.). For example, if a post or a media content item is ephemeral, data relating to feedback associated with the post or the media content item can expire when the post or the media content item expires. In some cases, at least of a portion of data relating to feedback associated with an ephemeral post or media content item can be maintained after the post or the media content item expires. All examples herein are provided for illustrative purposes, and there can be many variations and other possibilities.

Figure 2B:
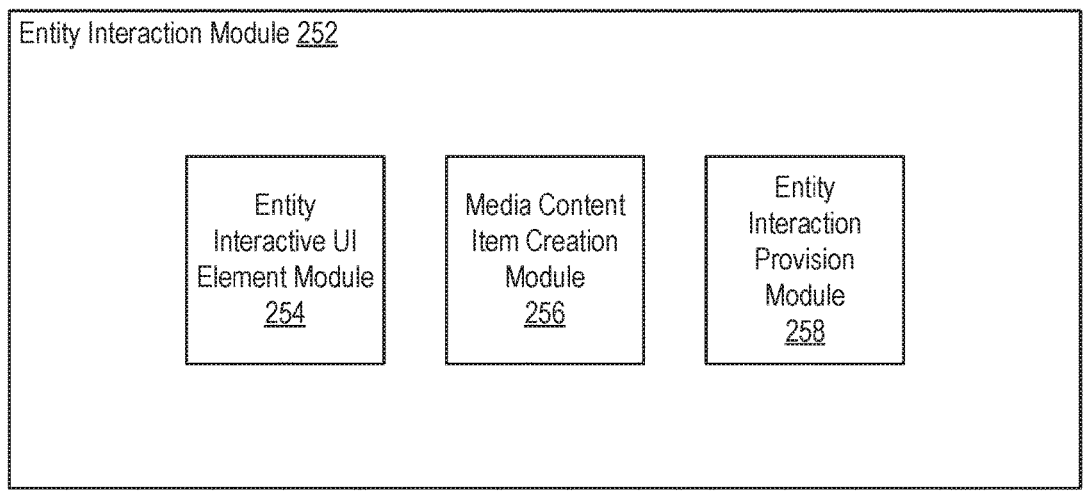
FIG. 2B illustrates an example entity interaction module configured to provide interactive user interface elements associated with entities within media content items, according to an embodiment of the present disclosure.

FIG. 2B illustrates an example entity interaction module 252 configured to provide interactive user interface elements associated with entities within media content items, according to an embodiment of the present disclosure. In some embodiments, the entity interaction module 106 of FIG. 1 can be implemented with the example entity interaction module 252. As shown in the example of FIG. 2B, the example entity interaction module 252 can include an entity interactive UI element module 254, a media content item creation module 256, and an entity interaction provision module 258.

The entity interactive UI element module 254 can provide a tool including one or more interactive UI elements associated with entities. An application can provide a tool that includes a set of interactive UI elements that can be added to a media content item. The tool can be the same tool provided by the interactive UI element tool module 254, or can be separate tool. An entity can opt to include interactive UI elements associated with the entity in the tool. For example, with respect to provision by an entity of interactive UI elements in the tool, the entity can enroll in a program, purchase a service, participate in a bidding process, etc. The tool can be considered an advertisement surface since an interactive UI element associated with an entity can lead to an opportunity for a sale, a conversion relating to an action or a call-to-action (CTA), etc. An interactive UI element associated with an entity can include a visual indication that can signal the identity of the entity to users. Examples of a visual indication for an entity can include a logo, a trademark, a name, an image, etc. An authoring user can access the tool and add one or more interactive UI elements associated with an entity to the authoring user's media content item. In some embodiments, the authoring user is not associated or affiliated with the entity. For example, the tool can be accessed by selecting an icon within a user interface of the application. An interactive UI element can include any type of element that can be included within a media content item in order to provide information or content associated with an entity. Examples of interactive UI elements can include buttons, links, tabs, images, icons, etc. Incentives can be provided to authoring users for adding interactive UI elements associated with an entity to media content items. In some instances, the incentives can be provided by the entity to the authoring users. For example, when an authoring user adds an interactive UI element to a media content item, the authoring user may receive points that can be used in connection with an entity associated with interactive UI element. Incentives can also be provided to viewing users to access interactive UI elements included in media content items. Similarly, in some instances, the incentives can be provided by an entity to the viewing users. For example, when a viewing user selects an interactive UI element, a discount for a related product can be provided to the viewing user. Examples of incentives can include free items, discounts, coupons, rewards, points, promotions, exclusive information or content, etc. Many variations are possible.

The media content item creation module 256 can create media content items including one or more interactive UI elements associated with entities. Media content items including interactive UI elements can be created in the same or similar manner as described in connection with the media content item creation module 206 in FIG. 2A. For example, an authoring user, through a tool of an application, can add one or more interactive UI elements associated with entities to a media content item. The authoring user can access the tool and add interactive UI elements to the media content item by selection (e.g., a click, a touch gesture, etc.), drag and drop, etc. The authoring user can determine placement and/or appearance of added interactive UI elements within the media content item. For example, the authoring user can move added interactive UI elements to different positions and/or alter or manipulate the added interactive UI elements in various ways (e.g., resize, rotate, change proportions, change colors, changing shapes, etc.). Added interactive UI elements can be embedded with the media content item. In some embodiments, added interactive UI elements may not be embedded within the media content item itself, but can be added to the media content item in a layer, as metadata. In certain embodiments, effects or other visual data can be added to a media content item when an interactive UI element is added to the media content item. For example, an animated effect can appear over a media content item, such as a video. In one implementation, falling snowflakes can be displayed when an interactive UI element associated with a winter sports company is added to a video.

The entity interaction provision module 258 can provide various actions associated with interactive UI elements associated with entities. As an example, information or content associated with an entity can be provided to a viewing user upon selection of an interactive UI element associated with the entity. For instance, selection of an interactive UI element can display a website or a page; play a video or an audio; provide a discount, coupon, or promotion; provide or execute a call-to-action (CTA); etc. As another example, upon selection of an interactive UI element associated with an entity, a workflow associated with the entity can be started. For instance, a workflow for buying or paying for a product or a service can be initiated. Many variations are possible. In certain embodiments, various actions associated with an entity may be available in response to selection of an interactive UI element only for a particular period of time (e.g., minute(s), hour(s), day(s), etc.) or within a particular area. For example, an entity can be a restaurant, and a discount for the restaurant can be available only at a specified time when a viewing user is at the restaurant.

In this manner, interactive UI elements can provide a dynamic and engaging way for users to interact with media content items. For example, viewing users can provide feedback for a media content item directly from within the media content item by selecting one or more interactive UI elements that an authoring user included in the media content item. Also, viewing users can interact with interactive UI elements associated with entities within media content items. Since interactive UI elements, such as buttons, are generally associated with actions, interactive UI elements associated with entities can help create interest on the part of viewing users in interacting with the interactive UI elements. For example, a viewing user may interact with an interactive UI element associated with an entity with an expectation that something will occur in response to the interaction. All examples herein are provided for illustrative purposes, and there can be many variations and other possibilities.

Figure 3A:
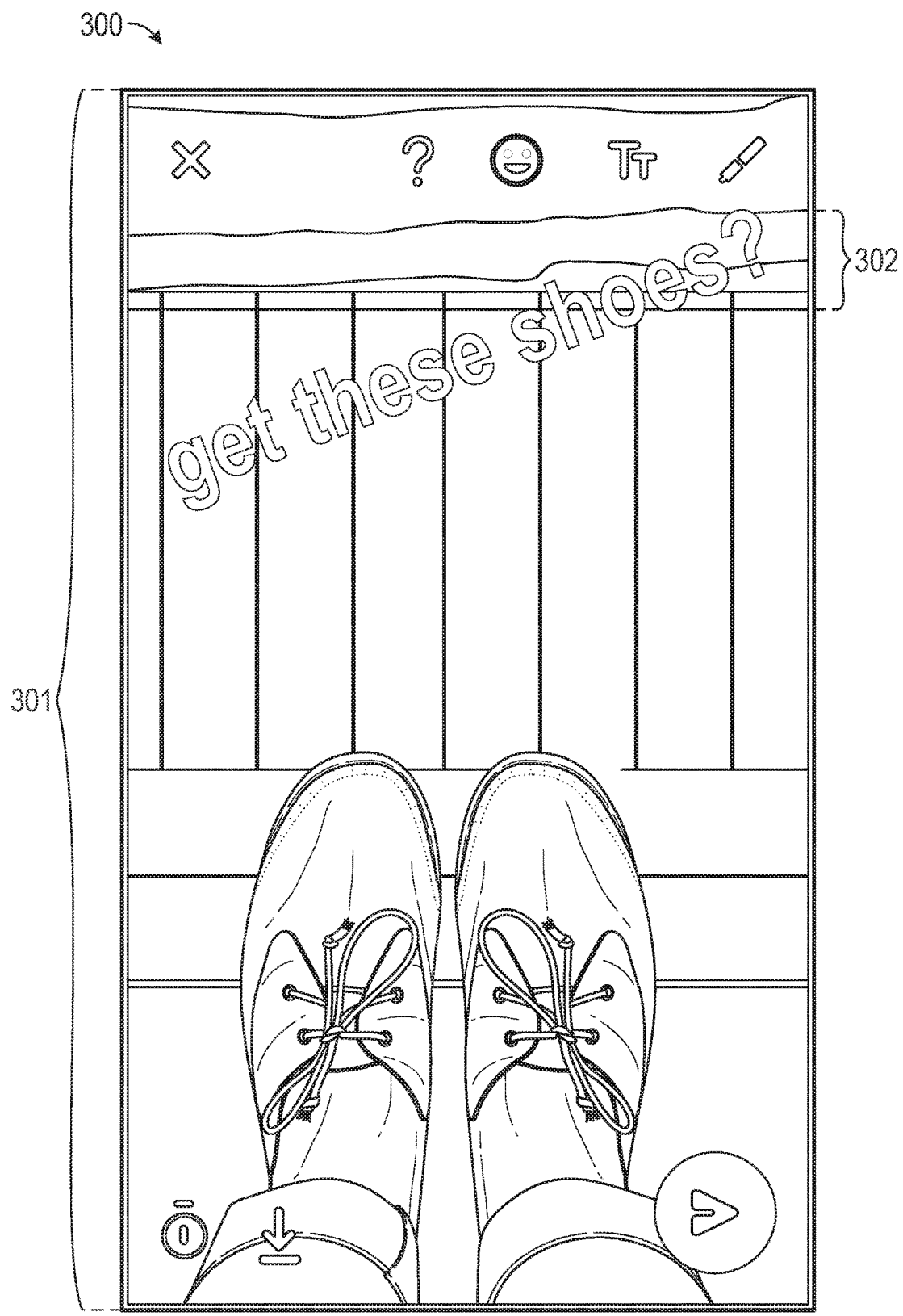
FIGS. 3A-3E illustrate example user interfaces for providing interactive user interface elements within media content items, according to an embodiment of the present disclosure.
Figure 3B:
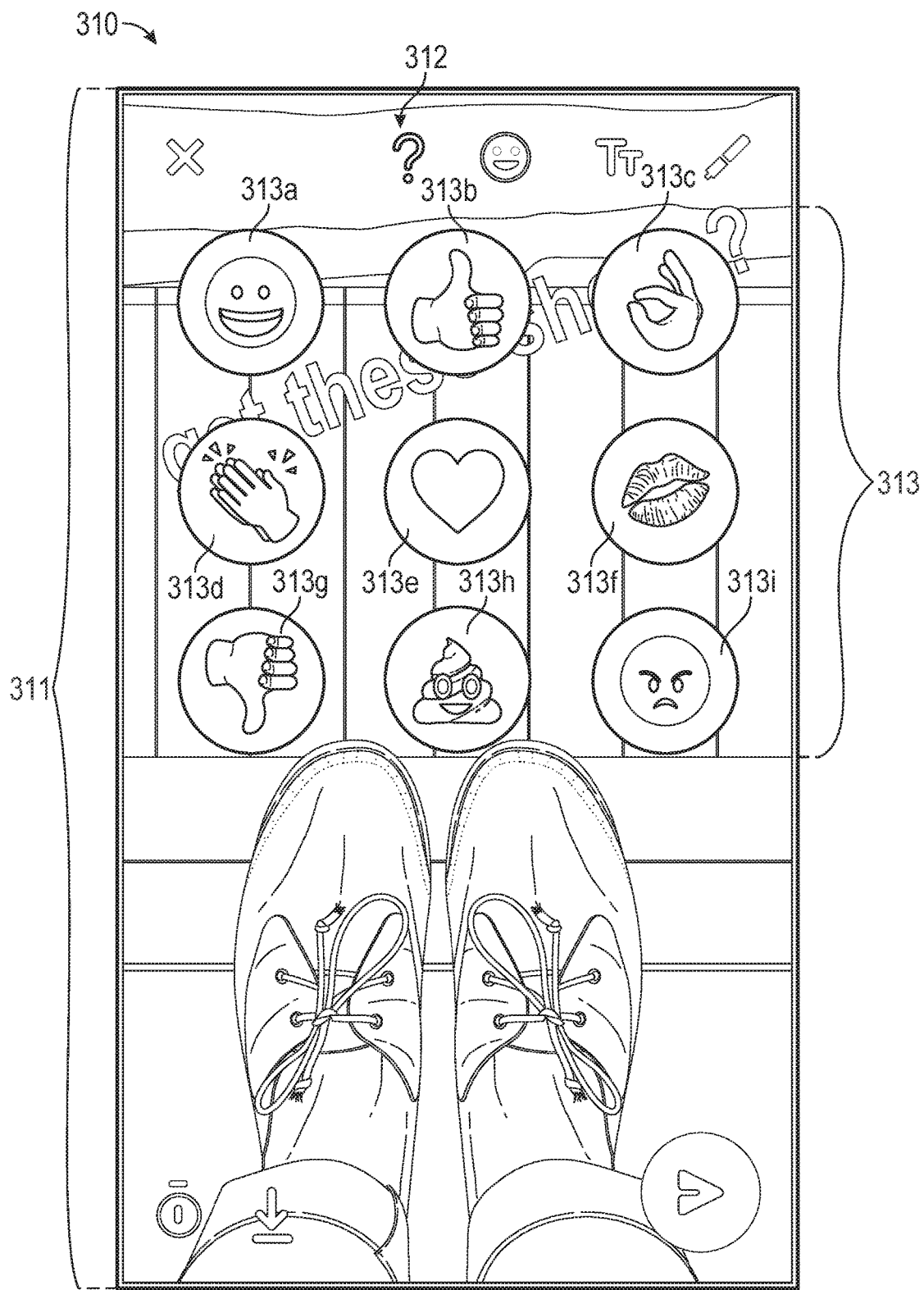
Figure 3C:
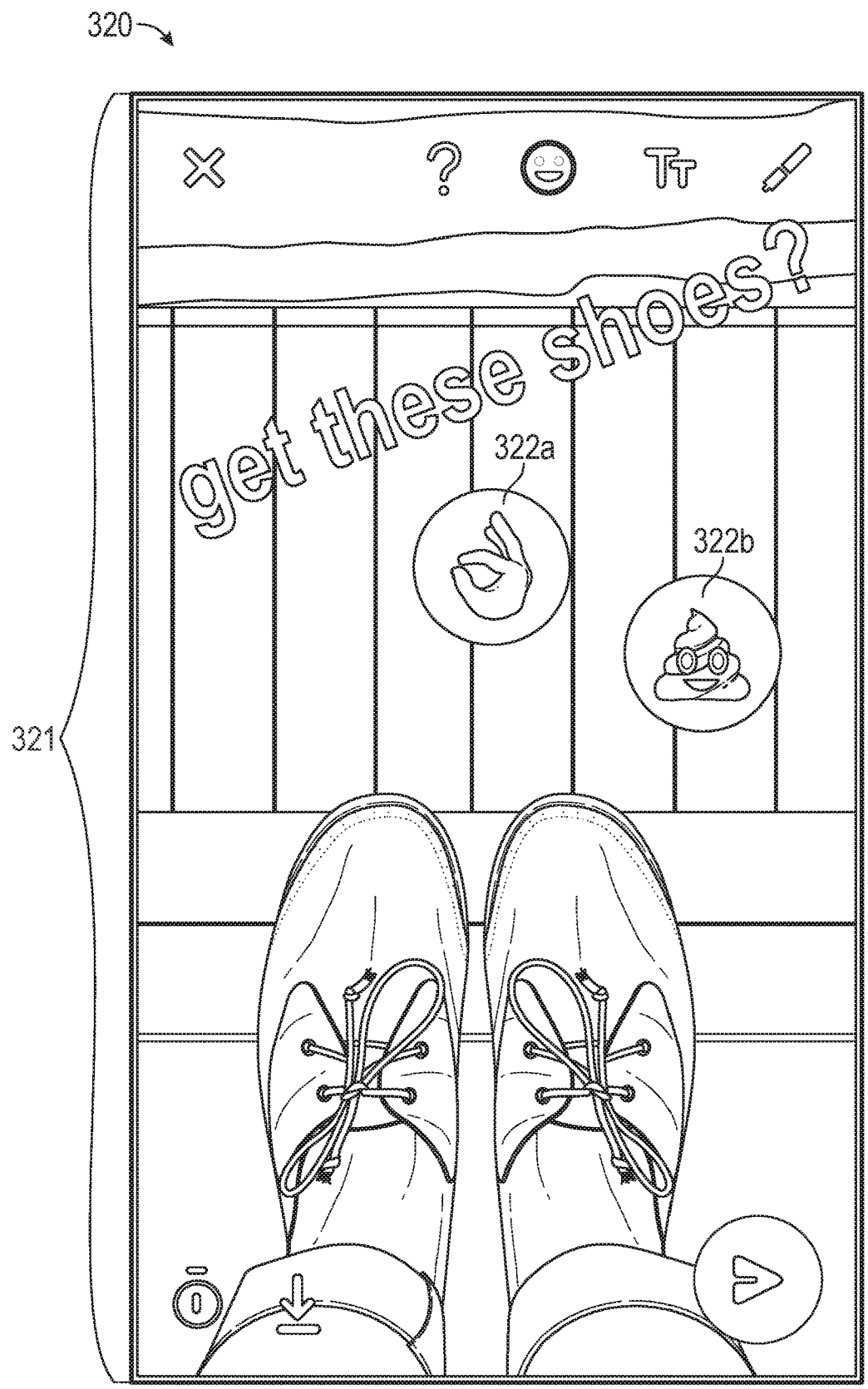
Figure 3D:
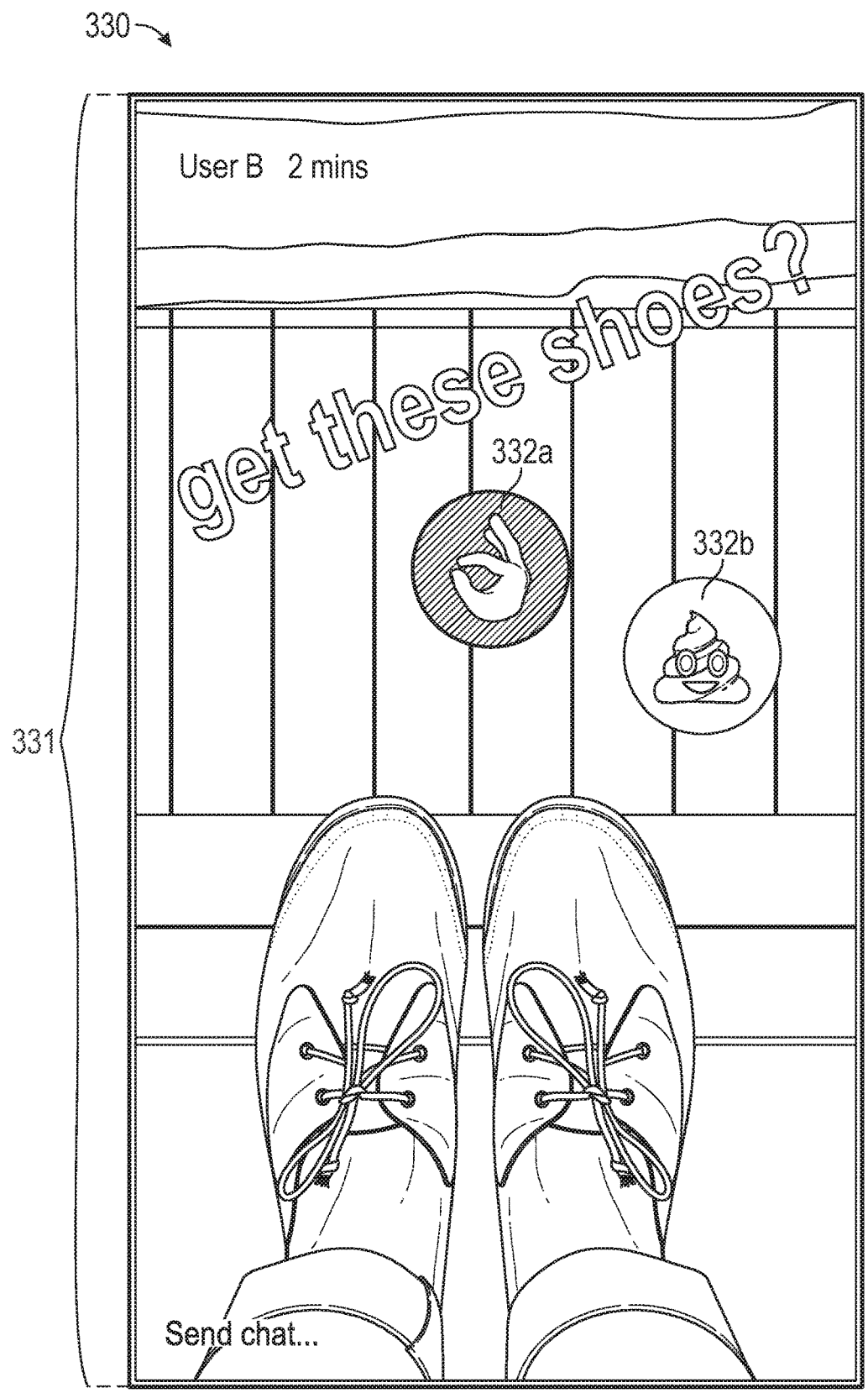
Figure 3E:
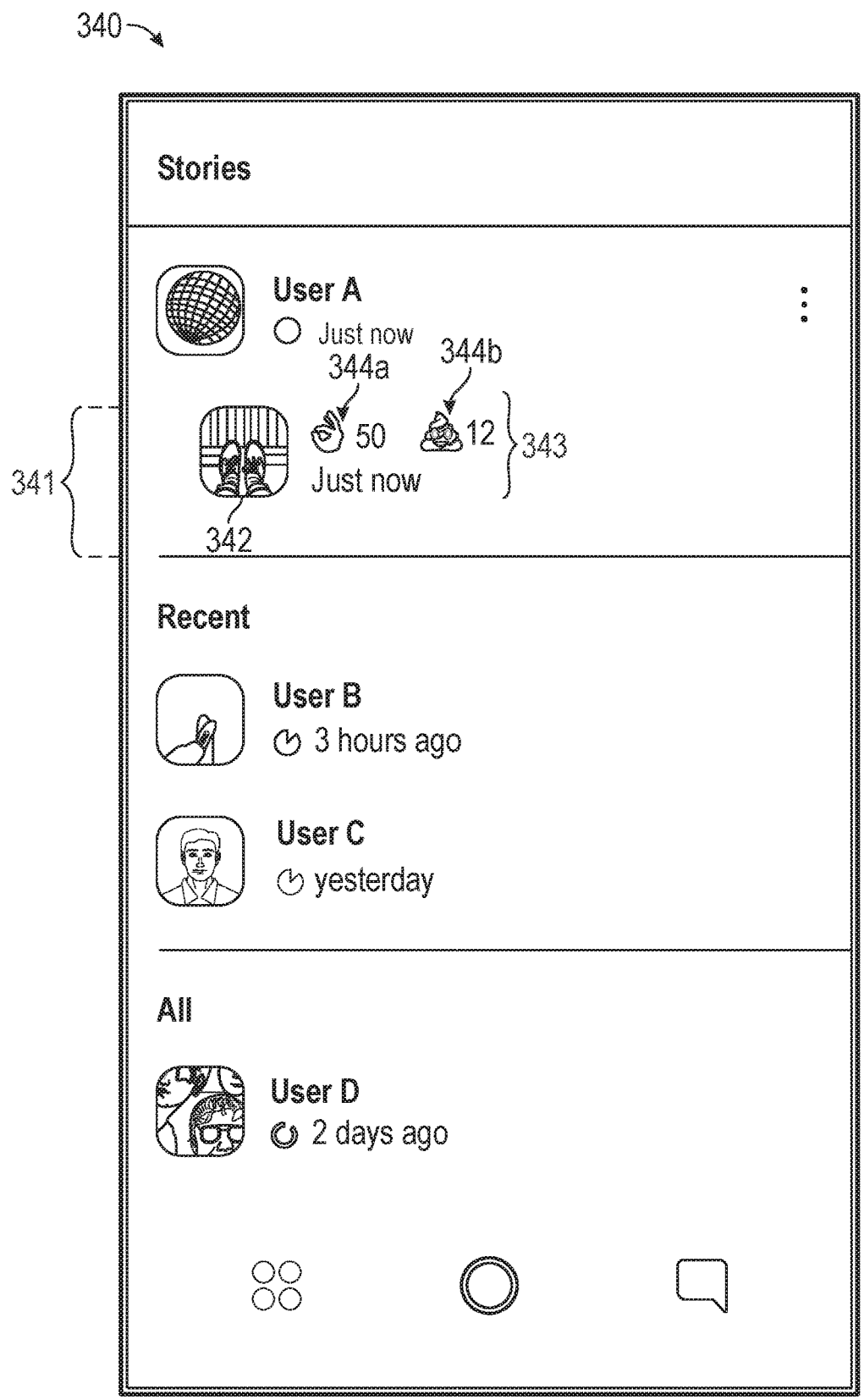

FIGS. 3A-3E illustrate example user interfaces for providing interactive user interface elements within media content items, according to an embodiment of the present disclosure. For example, interactive UI elements can be used to obtain feedback associated with a media content item. FIG. 3A illustrates an example user interface 300 in which an authoring user has created a media content item 301. In the example of FIG. 3A, the media content item 301 is an image of shoes. The authoring user has added a question 302 (i.e., "get these shoes?") in the media content item 301. FIG. 3B illustrates an example user interface 310 in which an authoring user has accessed an interactive feedback tool for adding interactive UI elements. For example, the authoring user can access the interactive feedback tool by selecting an icon 312. The interactive feedback tool includes a set of interactive UI elements 313. In the example of FIG. 3B, the interactive UI elements 313 are shown as buttons associated with emojis. While nine emoji buttons 313 are shown in FIG. 3B for illustrative purposes, any number of buttons can be included in the tool as appropriate. The nine emoji buttons 313 include: a smiley face emoji button 313a, a thumbs-up emoji button 313b, an ok emoji button 313c, a clap emoji button 313d, a heart emoji button 313e, a kiss mark emoji button 313f, a thumbs-down emoji button 313g, a pile of poo emoji button 313h, and an angry face emoji button 313i. FIG. 3C illustrates an example user interface 320 in which an authoring user has added two emoji buttons from an interactive feedback tool to a media content item 321. The authoring user can add emoji buttons to the media content item 321 by any appropriate user command to the user interface 320, such as selection, drag and drop, etc. The authoring user has selected the ok emoji button 322a and the pile of poo emoji button 322b to add to the media content item 321. By appropriate user commands, the authoring user can move the emoji buttons 332 to desired positions. In some embodiments, the user interface 320 can provide functionality to allow the authoring user to also modify appearance of the emoji buttons 332 as appropriate. FIG. 3D illustrates an example user interface 330 in which a viewing user has accessed a media content item 331. The media content item 331 includes the ok emoji button 332a and the pile of poo emoji button 332b as possible feedback options to the question in the media content item 331. In the example of FIG. 3D, the viewing user has selected the ok emoji button 332a as the viewing user's feedback option. A visual indication can be presented to the viewing user to reflect selection of the ok emoji button 332a. In the example shown, the ok emoji button 332a reflects selection by the viewing user through darkened portions of the ok emoji button 332a. The viewing user's feedback can be obtained and sent to a server. FIG. 3E illustrates an example user interface 340 in which an authoring user can access feedback associated with a media content item. The user interface 340 can show the authoring user's own story as well as stories of other users. In the example of FIG. 3E, the authoring user is User A, and User A's story shows a post or chapter 341 including the media content item. A representation 342 of the media content item and feedback 343 for the media content item can be displayed for the post 341. For example, the feedback 343 can include an aggregate summary of feedback from viewing users. In the example of FIG. 3E, emojis associated with feedback options are an ok emoji 344a and a pile of poo emoji 344b. The emojis 344a, 344b are displayed as a part of the feedback 343. A corresponding number of selections from viewing users associated with each emoji 344 can be displayed next to the emoji 344. All examples herein are provided for illustrative purposes, and there can be many variations and other possibilities.

Figure 4:
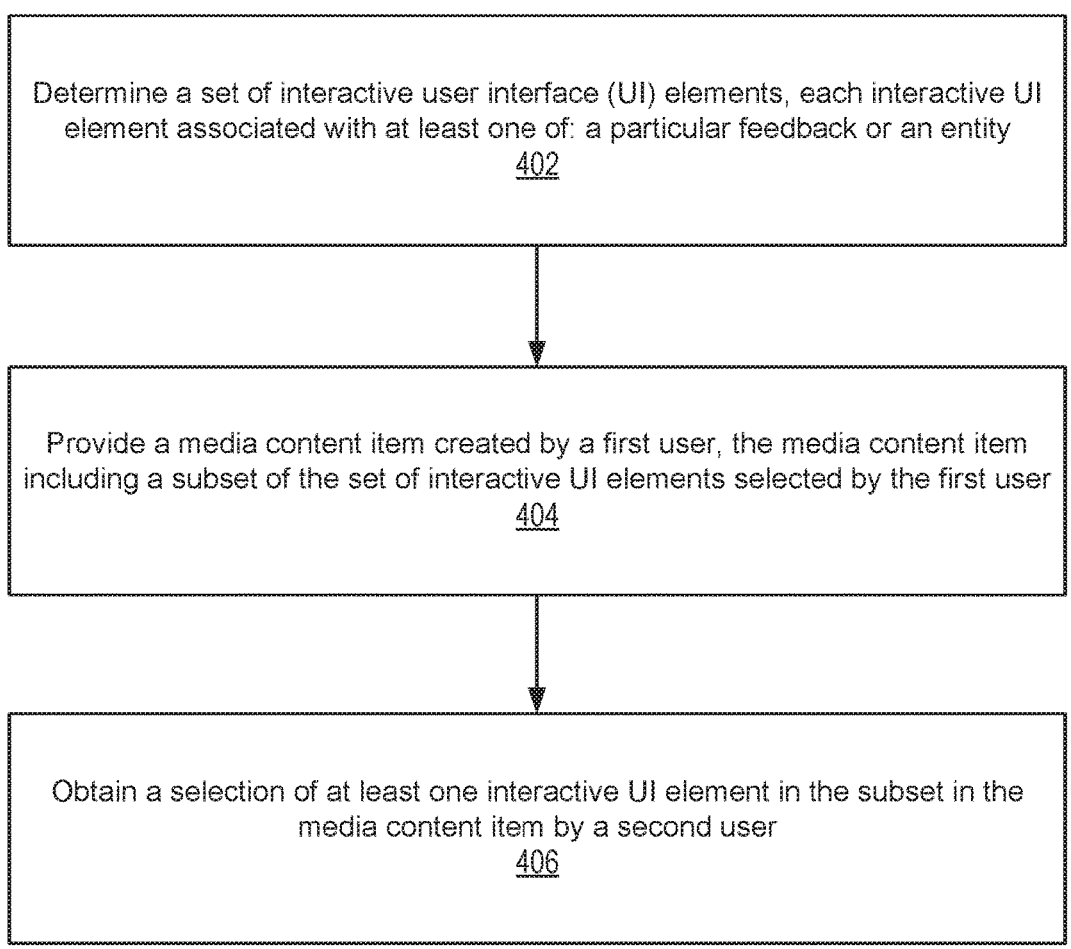
FIG. 4 illustrates an example first method for providing interactive user interface elements within media content items, according to an embodiment of the present disclosure.

FIG. 4 illustrates an example first method 400 for providing interactive user interface elements within media content items, according to an embodiment of the present disclosure. It should be understood that there can be additional, fewer, or alternative steps performed in similar or alternative orders, or in parallel, based on the various features and embodiments discussed herein unless otherwise stated.

At block 402, the example method 400 can determine a set of interactive user interface (UI) elements, each interactive UI element associated with at least one of: a particular feedback or an entity. At block 404, the example method 400 can provide a media content item created by a first user, the media content item including a subset of the set of interactive UI elements selected by the first user. At block 406, the example method 400 can obtain a selection of at least one interactive UI element in the subset in the media content item by a second user. Other suitable techniques that incorporate various features and embodiments of the present disclosure are possible.

FIG. 5 illustrates an example second method 500 for providing interactive user interface elements within media content items, according to an embodiment of the present disclosure. It should be understood that there can be additional, fewer, or alternative steps performed in similar or alternative orders, or in parallel, based on the various features and embodiments discussed herein unless otherwise stated. Certain steps of the method 500 may be performed in combination with the example method 400 explained above.

At block 502, the example method 500 can obtain feedback associated with a media content item from a plurality of users, wherein the feedback is indicated by selection of at least one interactive UI element in a subset of a set of interactive UI elements included in the media content item by each of the plurality of users. The media content item can be similar to the media content item explained in connection with FIG. 4. The subset of the set of interactive UI elements can be similar to the subset of the set of interactive UI elements explained in connection with FIG. 4. At block 504, the example method 500 can provide aggregated data relating to the feedback obtained from the plurality of users. Other suitable techniques that incorporate various features and embodiments of the present disclosure are possible.

It is contemplated that there can be many other uses, applications, features, possibilities, and/or variations associated with various embodiments of the present disclosure. For example, users can, in some cases, choose whether or not to opt-in to utilize the disclosed technology. The disclosed technology can, for instance, also ensure that various privacy settings, preferences, and configurations are maintained and can prevent private information from being divulged. In another example, various embodiments of the present disclosure can learn, improve, and/or be refined over time.

Social Networking System—Example Implementation

Figure 6:
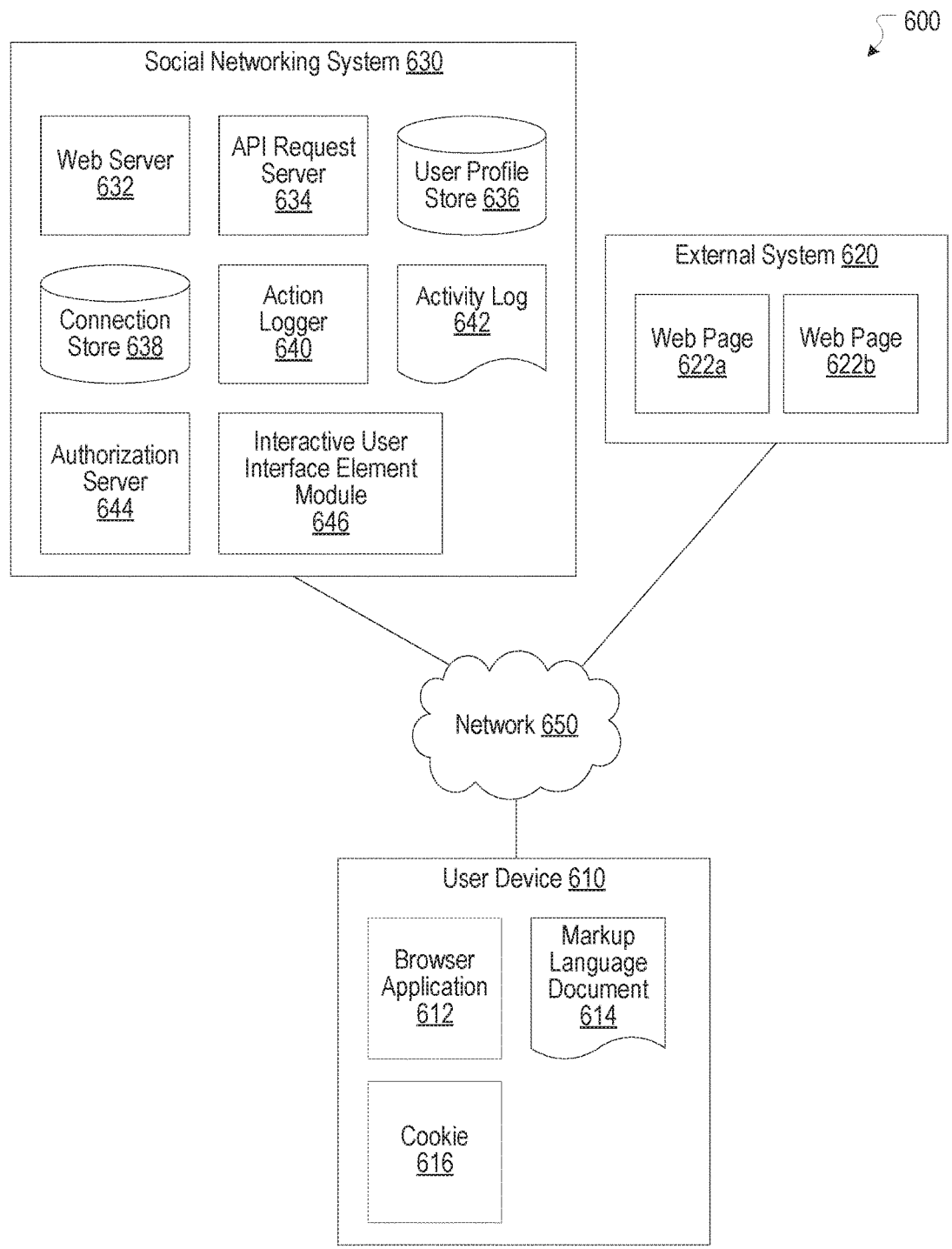
FIG. 6 illustrates a network diagram of an example system that can be utilized in various scenarios, according to an embodiment of the present disclosure.

FIG. 6 illustrates a network diagram of an example system 600 that can be utilized in various scenarios, in accordance with an embodiment of the present disclosure. The system 600 includes one or more user devices 610, one or more external systems 620, a social networking system (or service) 630, and a network 650. In an embodiment, the social networking service, provider, and/or system discussed in connection with the embodiments described above may be implemented as the social networking system 630. For purposes of illustration, the embodiment of the system 600, shown by FIG. 6, includes a single external system 620 and a single user device 610. However, in other embodiments, the system 600 may include more user devices 610 and/or more external systems 620. In certain embodiments, the social networking system 630 is operated by a social network provider, whereas the external systems 620 are separate from the social networking system 630 in that they may be operated by different entities. In various embodiments, however, the social networking system 630 and the external systems 620 operate in conjunction to provide social networking services to users (or members) of the social networking system 630. In this sense, the social networking system 630 provides a platform or backbone, which other systems, such as external systems 620, may use to provide social networking services and functionalities to users across the Internet.

The user device 610 comprises one or more computing devices that can receive input from a user and transmit and receive data via the network 650. In one embodiment, the user device 610 is a conventional computer system executing, for example, a Microsoft Windows compatible operating system (OS), Apple OS X, and/or a Linux distribution. In another embodiment, the user device 610 can be a device having computer functionality, such as a smart-phone, a tablet, a personal digital assistant (PDA), a mobile telephone, etc. The user device 610 is configured to communicate via the network 650. The user device 610 can execute an application, for example, a browser application that allows a user of the user device 610 to interact with the social networking system 630. In another embodiment, the user device 610 interacts with the social networking system 630 through an application programming interface (API) provided by the native operating system of the user device 610, such as iOS and ANDROID. The user device 610 is configured to communicate with the external system 620 and the social networking system 630 via the network 650, which may comprise any combination of local area and/or wide area networks, using wired and/or wireless communication systems.

In one embodiment, the network 650 uses standard communications technologies and protocols. Thus, the network 650 can include links using technologies such as Ethernet, 802.11, worldwide interoperability for microwave access (WiMAX), 3G, 4G, CDMA, GSM, LTE, digital subscriber line (DSL), etc. Similarly, the networking protocols used on the network 650 can include multiprotocol label switching (MPLS), transmission control protocol/Internet protocol (TCP/IP), User Datagram Protocol (UDP), hypertext transport protocol (HTTP), simple mail transfer protocol (SMTP), file transfer protocol (FTP), and the like. The data exchanged over the network 650 can be represented using technologies and/or formats including hypertext markup language (HTML) and extensible markup language (XML). In addition, all or some links can be encrypted using conventional encryption technologies such as secure sockets layer (SSL), transport layer security (TLS), and Internet Protocol security (IPsec).

In one embodiment, the user device 610 may display content from the external system 620 and/or from the social networking system 630 by processing a markup language document 614 received from the external system 620 and from the social networking system 630 using a browser application 612. The markup language document 614 identifies content and one or more instructions describing formatting or presentation of the content. By executing the instructions included in the markup language document 614, the browser application 612 displays the identified content using the format or presentation described by the markup language document 614. For example, the markup language document 614 includes instructions for generating and displaying a web page having multiple frames that include text and/or image data retrieved from the external system 620 and the social networking system 630. In various embodiments, the markup language document 614 comprises a data file including extensible markup language (XML) data, extensible hypertext markup language (XHTML) data, or other markup language data. Additionally, the markup language document 614 may include JavaScript Object Notation (JSON) data, JSON with padding (JSONP), and JavaScript data to facilitate data-interchange between the external system 620 and the user device 610. The browser application 612 on the user device 610 may use a JavaScript compiler to decode the markup language document 614.

The markup language document 614 may also include, or link to, applications or application frameworks such as FLASH™ or Unity™ applications, the SilverLight™ application framework, etc.

In one embodiment, the user device 610 also includes one or more cookies 616 including data indicating whether a user of the user device 610 is logged into the social networking system 630, which may enable modification of the data communicated from the social networking system 630 to the user device 610.

The external system 620 includes one or more web servers that include one or more web pages 622a, 622b, which are communicated to the user device 610 using the network 650. The external system 620 is separate from the social networking system 630. For example, the external system 620 is associated with a first domain, while the social networking system 630 is associated with a separate social networking domain. Web pages 622a, 622b, included in the external system 620, comprise markup language documents 614 identifying content and including instructions specifying formatting or presentation of the identified content.

The social networking system 630 includes one or more computing devices for a social network, including a plurality of users, and providing users of the social network with the ability to communicate and interact with other users of the social network. In some instances, the social network can be represented by a graph, i.e., a data structure including edges and nodes. Other data structures can also be used to represent the social network, including but not limited to databases, objects, classes, meta elements, files, or any other data structure. The social networking system 630 may be administered, managed, or controlled by an operator. The operator of the social networking system 630 may be a human being, an automated application, or a series of applications for managing content, regulating policies, and collecting usage metrics within the social networking system 630. Any type of operator may be used.

Users may join the social networking system 630 and then add connections to any number of other users of the social networking system 630 to whom they desire to be connected. As used herein, the term "friend" refers to any other user of the social networking system 630 to whom a user has formed a connection, association, or relationship via the social networking system 630. For example, in an embodiment, if users in the social networking system 630 are represented as nodes in the social graph, the term "friend" can refer to an edge formed between and directly connecting two user nodes.

Connections may be added explicitly by a user or may be automatically created by the social networking system 630 based on common characteristics of the users (e.g., users who are alumni of the same educational institution). For example, a first user specifically selects a particular other user to be a friend. Connections in the social networking system 630 are usually in both directions, but need not be, so the terms "user" and "friend" depend on the frame of reference. Connections between users of the social networking system 630 are usually bilateral ("two-way"), or "mutual," but connections may also be unilateral, or "one-way." For example, if Bob and Joe are both users of the social networking system 630 and connected to each other, Bob and Joe are each other's connections. If, on the other hand, Bob wishes to connect to Joe to view data communicated to the social networking system 630 by Joe, but Joe does not wish to form a mutual connection, a unilateral connection may be established. The connection between users may be a direct connection; however, some embodiments of the social networking system 630 allow the connection to be indirect via one or more levels of connections or degrees of separation.

In addition to establishing and maintaining connections between users and allowing interactions between users, the social networking system 630 provides users with the ability to take actions on various types of items supported by the social networking system 630. These items may include groups or networks (i.e., social networks of people, entities, and concepts) to which users of the social networking system 630 may belong, events or calendar entries in which a user might be interested, computer-based applications that a user may use via the social networking system 630, transactions that allow users to buy or sell items via services provided by or through the social networking system 630, and interactions with advertisements that a user may perform on or off the social networking system 630. These are just a few examples of the items upon which a user may act on the social networking system 630, and many others are possible. A user may interact with anything that is capable of being represented in the social networking system 630 or in the external system 620, separate from the social networking system 630, or coupled to the social networking system 630 via the network 650.

The social networking system 630 is also capable of linking a variety of entities. For example, the social networking system 630 enables users to interact with each other as well as external systems 620 or other entities through an API, a web service, or other communication channels. The social networking system 630 generates and maintains the "social graph" comprising a plurality of nodes interconnected by a plurality of edges. Each node in the social graph may represent an entity that can act on another node and/or that can be acted on by another node. The social graph may include various types of nodes. Examples of types of nodes include users, non-person entities, content items, web pages, groups, activities, messages, concepts, and any other things that can be represented by an object in the social networking system 630. An edge between two nodes in the social graph may represent a particular kind of connection, or association, between the two nodes, which may result from node relationships or from an action that was performed by one of the nodes on the other node. In some cases, the edges between nodes can be weighted. The weight of an edge can represent an attribute associated with the edge, such as a strength of the connection or association between nodes. Different types of edges can be provided with different weights. For example, an edge created when one user "likes" another user may be given one weight, while an edge created when a user befriends another user may be given a different weight.

As an example, when a first user identifies a second user as a friend, an edge in the social graph is generated connecting a node representing the first user and a second node representing the second user. As various nodes relate or interact with each other, the social networking system 630 modifies edges connecting the various nodes to reflect the relationships and interactions.

The social networking system 630 also includes user-generated content, which enhances a user's interactions with the social networking system 630. User-generated content may include anything a user can add, upload, send, or "post" to the social networking system 630. For example, a user communicates posts to the social networking system 630 from a user device 610. Posts may include data such as status updates or other textual data, location information, images such as photos, videos, links, music or other similar data and/or media. Content may also be added to the social networking system 630 by a third party. Content "items" are represented as objects in the social networking system 630. In this way, users of the social networking system 630 are encouraged to communicate with each other by posting text and content items of various types of media through various communication channels. Such communication increases the interaction of users with each other and increases the frequency with which users interact with the social networking system 630.

The social networking system 630 includes a web server 632, an API request server 634, a user profile store 636, a connection store 638, an action logger 640, an activity log 642, and an authorization server 644. In an embodiment of the invention, the social networking system 630 may include additional, fewer, or different components for various applications. Other components, such as network interfaces, security mechanisms, load balancers, failover servers, management and network operations consoles, and the like are not shown so as to not obscure the details of the system.

The user profile store 636 maintains information about user accounts, including biographic, demographic, and other types of descriptive information, such as work experience, educational history, hobbies or preferences, location, and the like that has been declared by users or inferred by the social networking system 630. This information is stored in the user profile store 636 such that each user is uniquely identified. The social networking system 630 also stores data describing one or more connections between different users in the connection store 638. The connection information may indicate users who have similar or common work experience, group memberships, hobbies, or educational history. Additionally, the social networking system 630 includes user-defined connections between different users, allowing users to specify their relationships with other users. For example, user-defined connections allow users to generate relationships with other users that parallel the users' real-life relationships, such as friends, co-workers, partners, and so forth. Users may select from predefined types of connections, or define their own connection types as needed. Connections with other nodes in the social networking system 630, such as non-person entities, buckets, cluster centers, images, interests, pages, external systems, concepts, and the like are also stored in the connection store 638.

The social networking system 630 maintains data about objects with which a user may interact. To maintain this data, the user profile store 636 and the connection store 638 store instances of the corresponding type of objects maintained by the social networking system 630. Each object type has information fields that are suitable for storing information appropriate to the type of object. For example, the user profile store 636 contains data structures with fields suitable for describing a user's account and information related to a user's account. When a new object of a particular type is created, the social networking system 630 initializes a new data structure of the corresponding type, assigns a unique object identifier to it, and begins to add data to the object as needed. This might occur, for example, when a user becomes a user of the social networking system 630, the social networking system 630 generates a new instance of a user profile in the user profile store 636, assigns a unique identifier to the user account, and begins to populate the fields of the user account with information provided by the user.

The connection store 638 includes data structures suitable for describing a user's connections to other users, connections to external systems 620 or connections to other entities. The connection store 638 may also associate a connection type with a user's connections, which may be used in conjunction with the user's privacy setting to regulate access to information about the user. In an embodiment of the invention, the user profile store 636 and the connection store 638 may be implemented as a federated database.

Data stored in the connection store 638, the user profile store 636, and the activity log 642 enables the social networking system 630 to generate the social graph that uses nodes to identify various objects and edges connecting nodes to identify relationships between different objects. For example, if a first user establishes a connection with a second user in the social networking system 630, user accounts of the first user and the second user from the user profile store 636 may act as nodes in the social graph. The connection between the first user and the second user stored by the connection store 638 is an edge between the nodes associated with the first user and the second user. Continuing this example, the second user may then send the first user a message within the social networking system 630. The action of sending the message, which may be stored, is another edge between the two nodes in the social graph representing the first user and the second user. Additionally, the message itself may be identified and included in the social graph as another node connected to the nodes representing the first user and the second user.

In another example, a first user may tag a second user in an image that is maintained by the social networking system 630 (or, alternatively, in an image maintained by another system outside of the social networking system 630). The image may itself be represented as a node in the social networking system 630. This tagging action may create edges between the first user and the second user as well as create an edge between each of the users and the image, which is also a node in the social graph. In yet another example, if a user confirms attending an event, the user and the event are nodes obtained from the user profile store 636, where the attendance of the event is an edge between the nodes that may be retrieved from the activity log 642. By generating and maintaining the social graph, the social networking system 630 includes data describing many different types of objects and the interactions and connections among those objects, providing a rich source of socially relevant information.

The web server 632 links the social networking system 630 to one or more user devices 610 and/or one or more external systems 620 via the network 650. The web server 632 serves web pages, as well as other web-related content, such as Java, JavaScript, Flash, XML, and so forth. The web server 632 may include a mail server or other messaging functionality for receiving and routing messages between the social networking system 630 and one or more user devices 610. The messages can be instant messages, queued messages (e.g., email), text and SMS messages, or any other suitable messaging format.

The API request server 634 allows one or more external systems 620 and user devices 610 to call access information from the social networking system 630 by calling one or more API functions. The API request server 634 may also allow external systems 620 to send information to the social networking system 630 by calling APIs. The external system 620, in one embodiment, sends an API request to the social networking system 630 via the network 650, and the API request server 634 receives the API request. The API request server 634 processes the request by calling an API associated with the API request to generate an appropriate response, which the API request server 634 communicates to the external system 620 via the network 650. For example, responsive to an API request, the API request server 634 collects data associated with a user, such as the user's connections that have logged into the external system 620, and communicates the collected data to the external system 620. In another embodiment, the user device 610 communicates with the social networking system 630 via APIs in the same manner as external systems 620.

The action logger 640 is capable of receiving communications from the web server 632 about user actions on and/or off the social networking system 630. The action logger 640 populates the activity log 642 with information about user actions, enabling the social networking system 630 to discover various actions taken by its users within the social networking system 630 and outside of the social networking system 630. Any action that a particular user takes with respect to another node on the social networking system 630 may be associated with each user's account, through information maintained in the activity log 642 or in a similar database or other data repository. Examples of actions taken by a user within the social networking system 630 that are identified and stored may include, for example, adding a connection to another user, sending a message to another user, reading a message from another user, viewing content associated with another user, attending an event posted by another user, posting an image, attempting to post an image, or other actions interacting with another user or another object. When a user takes an action within the social networking system 630, the action is recorded in the activity log 642. In one embodiment, the social networking system 630 maintains the activity log 642 as a database of entries. When an action is taken within the social networking system 630, an entry for the action is added to the activity log 642. The activity log 642 may be referred to as an action log.

Additionally, user actions may be associated with concepts and actions that occur within an entity outside of the social networking system 630, such as an external system 620 that is separate from the social networking system 630. For example, the action logger 640 may receive data describing a user's interaction with an external system 620 from the web server 632. In this example, the external system 620 reports a user's interaction according to structured actions and objects in the social graph.

Other examples of actions where a user interacts with an external system 620 include a user expressing an interest in an external system 620 or another entity, a user posting a comment to the social networking system 630 that discusses an external system 620 or a web page 622a within the external system 620, a user posting to the social networking system 630 a Uniform Resource Locator (URL) or other identifier associated with an external system 620, a user attending an event associated with an external system 620, or any other action by a user that is related to an external system 620. Thus, the activity log 642 may include actions describing interactions between a user of the social networking system 630 and an external system 620 that is separate from the social networking system 630.

The authorization server 644 enforces one or more privacy settings of the users of the social networking system 630. A privacy setting of a user determines how particular information associated with a user can be shared. The privacy setting comprises the specification of particular information associated with a user and the specification of the entity or entities with whom the information can be shared. Examples of entities with which information can be shared may include other users, applications, external systems 620, or any entity that can potentially access the information. The information that can be shared by a user comprises user account information, such as profile photos, phone numbers associated with the user, user's connections, actions taken by the user such as adding a connection, changing user profile information, and the like.

The privacy setting specification may be provided at different levels of granularity. For example, the privacy setting may identify specific information to be shared with other users; the privacy setting identifies a work phone number or a specific set of related information, such as, personal information including profile photo, home phone number, and status. Alternatively, the privacy setting may apply to all the information associated with the user. The specification of the set of entities that can access particular information can also be specified at various levels of granularity. Various sets of entities with which information can be shared may include, for example, all friends of the user, all friends of friends, all applications, or all external systems 620. One embodiment allows the specification of the set of entities to comprise an enumeration of entities. For example, the user may provide a list of external systems 620 that are allowed to access certain information. Another embodiment allows the specification to comprise a set of entities along with exceptions that are not allowed to access the information. For example, a user may allow all external systems 620 to access the user's work information, but specify a list of external systems 620 that are not allowed to access the work information. Certain embodiments call the list of exceptions that are not allowed to access certain information a "block list". External systems 620 belonging to a block list specified by a user are blocked from accessing the information specified in the privacy setting. Various combinations of granularity of specification of information, and granularity of specification of entities, with which information is shared are possible. For example, all personal information may be shared with friends whereas all work information may be shared with friends of friends.

The authorization server 644 contains logic to determine if certain information associated with a user can be accessed by a user's friends, external systems 620, and/or other applications and entities. The external system 620 may need authorization from the authorization server 644 to access the user's more private and sensitive information, such as the user's work phone number. Based on the user's privacy settings, the authorization server 644 determines if another user, the external system 620, an application, or another entity is allowed to access information associated with the user, including information about actions taken by the user.

In some embodiments, the social networking system 630 can include an interactive user interface element module 646. The interactive user interface element module 646 can be implemented with the interactive user interface element module 102, as discussed in more detail herein. In some embodiments, one or more functionalities of the interactive user interface element module 646 can be implemented in the user device 610.

Hardware Implementation

Figure 7:
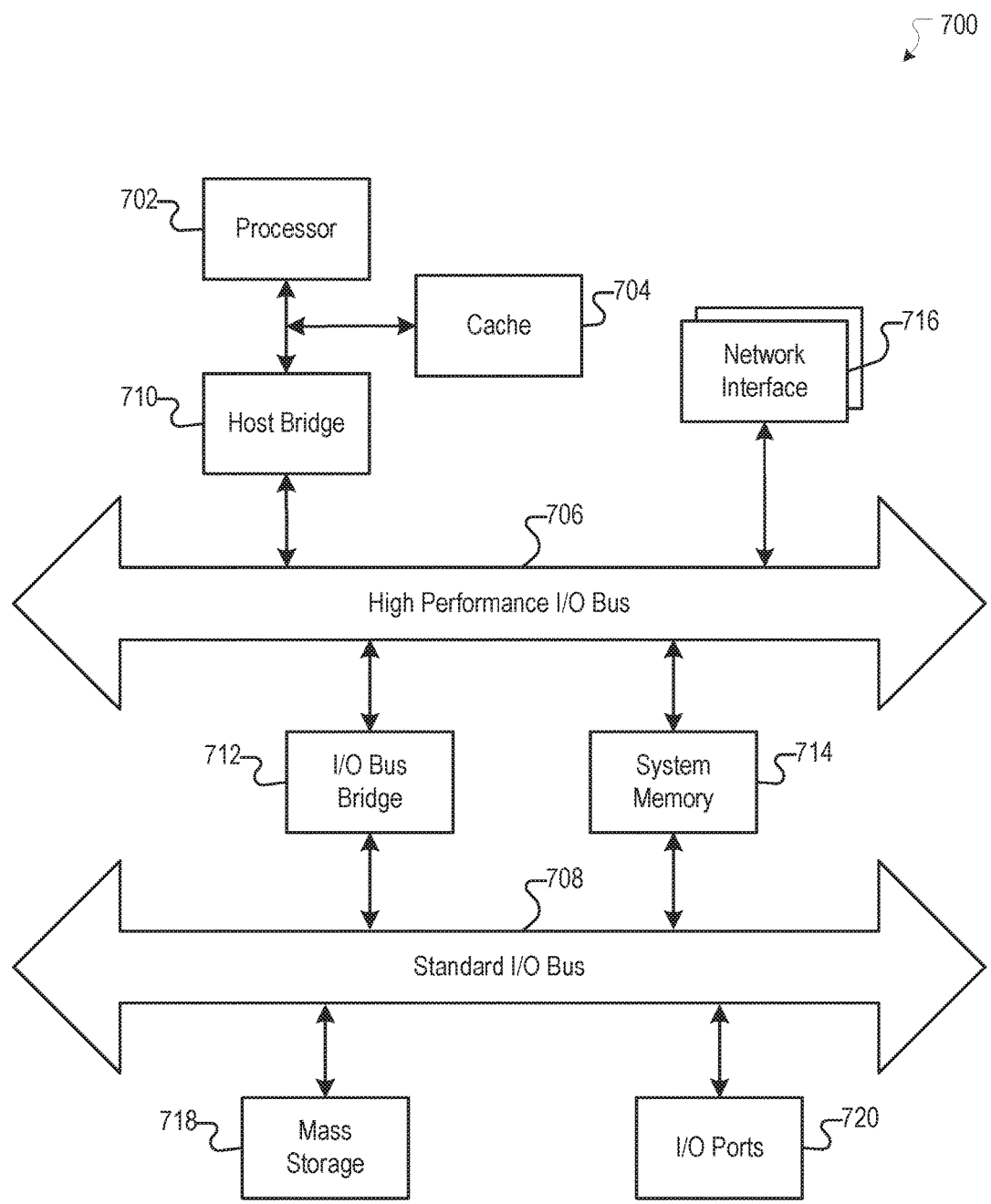
FIG. 7 illustrates an example of a computer system that can be utilized in various scenarios, according to an embodiment of the present disclosure.

The foregoing processes and features can be implemented by a wide variety of machine and computer system architectures and in a wide variety of network and computing environments. FIG. 7 illustrates an example of a computer system 700 that may be used to implement one or more of the embodiments described herein in accordance with an embodiment of the invention. The computer system 700 includes sets of instructions for causing the computer system 700 to perform the processes and features discussed herein. The computer system 700 may be connected (e.g., networked) to other machines. In a networked deployment, the computer system 700 may operate in the capacity of a server machine or a client machine in a client-server network environment, or as a peer machine in a peer-to-peer (or distributed) network environment. In an embodiment of the invention, the computer system 700 may be the social networking system 630, the user device 610, and the external system 720, or a component thereof. In an embodiment of the invention, the computer system 700 may be one server among many that constitutes all or part of the social networking system 630.

The computer system 700 includes a processor 702, a cache 704, and one or more executable modules and drivers, stored on a computer-readable medium, directed to the processes and features described herein. Additionally, the computer system 700 includes a high performance input/output (I/O) bus 706 and a standard I/O bus 708. A host bridge 710 couples processor 702 to high performance I/O bus 706, whereas I/O bus bridge 712 couples the two buses 706 and 708 to each other. A system memory 714 and one or more network interfaces 716 couple to high performance I/O bus 706. The computer system 700 may further include video memory and a display device coupled to the video memory (not shown). Mass storage 718 and I/O ports 720 couple to the standard I/O bus 708. The computer system 700 may optionally include a keyboard and pointing device, a display device, or other input/output devices (not shown) coupled to the standard I/O bus 708. Collectively, these elements are intended to represent a broad category of computer hardware systems, including but not limited to computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

An operating system manages and controls the operation of the computer system 700, including the input and output of data to and from software applications (not shown). The operating system provides an interface between the software applications being executed on the system and the hardware components of the system. Any suitable operating system may be used, such as the LINUX Operating System, the Apple Macintosh Operating System, available from Apple Computer Inc. of Cupertino, Calif., UNIX operating systems, Microsoft® Windows® operating systems, BSD operating systems, and the like. Other implementations are possible.

The elements of the computer system 700 are described in greater detail below. In particular, the network interface 716 provides communication between the computer system 700 and any of a wide range of networks, such as an Ethernet (e.g., IEEE 802.3) network, a backplane, etc. The mass storage 718 provides permanent storage for the data and programming instructions to perform the above-described processes and features implemented by the respective computing systems identified above, whereas the system memory 714 (e.g., DRAM) provides temporary storage for the data and programming instructions when executed by the processor 702. The I/O ports 720 may be one or more serial and/or parallel communication ports that provide communication between additional peripheral devices, which may be coupled to the computer system 700.

The computer system 700 may include a variety of system architectures, and various components of the computer system 700 may be rearranged. For example, the cache 704 may be on-chip with processor 702. Alternatively, the cache 704 and the processor 702 may be packed together as a "processor module", with processor 702 being referred to as the "processor core". Furthermore, certain embodiments of the invention may neither require nor include all of the above components. For example, peripheral devices coupled to the standard I/O bus 708 may couple to the high performance I/O bus 706. In addition, in some embodiments, only a single bus may exist, with the components of the computer system 700 being coupled to the single bus. Moreover, the computer system 700 may include additional components, such as additional processors, storage devices, or memories.

In general, the processes and features described herein may be implemented as part of an operating system or a specific application, component, program, object, module, or series of instructions referred to as "programs". For example, one or more programs may be used to execute specific processes described herein. The programs typically comprise one or more instructions in various memory and storage devices in the computer system 700 that, when read and executed by one or more processors, cause the computer system 700 to perform operations to execute the processes and features described herein. The processes and features described herein may be implemented in software, firmware, hardware (e.g., an application specific integrated circuit), or any combination thereof.

In one implementation, the processes and features described herein are implemented as a series of executable modules run by the computer system 700, individually or collectively in a distributed computing environment. The foregoing modules may be realized by hardware, executable modules stored on a computer-readable medium (or machine-readable medium), or a combination of both. For example, the modules may comprise a plurality or series of instructions to be executed by a processor in a hardware system, such as the processor 702. Initially, the series of instructions may be stored on a storage device, such as the mass storage 718. However, the series of instructions can be stored on any suitable computer readable storage medium. Furthermore, the series of instructions need not be stored locally, and could be received from a remote storage device, such as a server on a network, via the network interface 716. The instructions are copied from the storage device, such as the mass storage 718, into the system memory 714 and then accessed and executed by the processor 702. In various implementations, a module or modules can be executed by a processor or multiple processors in one or multiple locations, such as multiple servers in a parallel processing environment.

Examples of computer-readable media include, but are not limited to, recordable type media such as volatile and non-volatile memory devices; solid state memories; floppy and other removable disks; hard disk drives; magnetic media; optical disks (e.g., Compact Disk Read-Only Memory (CD ROMS), Digital Versatile Disks (DVDs)); other similar non-transitory (or transitory), tangible (or non-tangible) storage medium; or any type of medium suitable for storing, encoding, or carrying a series of instructions for execution by the computer system 700 to perform any one or more of the processes and features described herein.

For purposes of explanation, numerous specific details are set forth in order to provide a thorough understanding of the description. It will be apparent, however, to one skilled in the art that embodiments of the disclosure can be practiced without these specific details. In some instances, modules, structures, processes, features, and devices are shown in block diagram form in order to avoid obscuring the description. In other instances, functional block diagrams and flow diagrams are shown to represent data and logic flows. The components of block diagrams and flow diagrams (e.g., modules, blocks, structures, devices, features, etc.) may be variously combined, separated, removed, reordered, and replaced in a manner other than as expressly described and depicted herein.

Reference in this specification to "one embodiment", "an embodiment", "other embodiments", "one series of embodiments", "some embodiments", "various embodiments", or the like means that a particular feature, design, structure, or characteristic described in connection with the embodiment is included in at least one embodiment of the disclosure. The appearances of, for example, the phrase "in one embodiment" or "in an embodiment" in various places in the specification are not necessarily all referring to the same embodiment, nor are separate or alternative embodiments mutually exclusive of other embodiments. Moreover, whether or not there is express reference to an "embodiment" or the like, various features are described, which may be variously combined and included in some embodiments, but also variously omitted in other embodiments. Similarly, various features are described that may be preferences or requirements for some embodiments, but not other embodiments.

The language used herein has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A computer-implemented method comprising:
    determining, by a computing system, a set of interactive user interface (UI) elements, each interactive UI element associated with at least one of: a particular feedback or an entity;
    providing, by the computing system, a media content item created by a first user associated with a computing device, the media content item including a subset of the set of interactive UI elements displayed through the computing device and selected by the first user, wherein placement or appearance of the subset of the set of interactive UI elements over the media content as displayed through the computing device is determined by the first user, wherein the media content item including the subset of the set of interactive UI elements is published on a social networking system by the first user; and
    obtaining, by the computing system, a selection of at least one interactive UI element in the subset in the media content item by a second user via the social networking system.

2. The computer-implemented method of claim 1, wherein the set of interactive UI elements is associated with one or more of: emojis, images, or animations.

3. The computer-implemented method of claim 1, wherein an interactive UI element includes one or more of: a button, a link, a tab, an image, or an icon.

4. The computer-implemented method of claim 1, further comprising obtaining feedback associated with the media content item from the second user, wherein the feedback is indicated by the at least one interactive UI element in the subset selected by the second user.

5. The computer-implemented method of claim 1, further comprising providing the obtained feedback to the first user.

6. The computer-implemented method of claim 5, further comprising:
    obtaining feedback associated with the media content item from a plurality of users, wherein the feedback is indicated by selection of at least one interactive UI element in the subset by each of the plurality of users; and
    providing aggregated data relating to the feedback obtained from the plurality of users.

7. The computer-implemented method of claim 1, further comprising executing an action associated with the at least one interactive UI element in the subset selected by the second user, wherein the at least one interactive UI element is associated with an entity.

8. The computer-implemented method of claim 7, wherein the action includes providing one or more of: information associated with the entity, a call-to-action (CTA) associated with the entity, a discount, a coupon, or a workflow associated with the entity.

9. The computer-implemented method of claim 7, wherein an incentive associated with the entity is provided to at least one of the first user or the second user, wherein the incentive is provided to the first user in response to selection of the at least one interactive UI element for the subset by the first user and the incentive is provided to the second user in response to the selection of the at least one interactive UI element by the second user.

10. The computer-implemented method of claim 1, wherein the subset is embedded within the media content item.

11. A system comprising:
    at least one hardware processor; and
    a memory storing instructions that, when executed by the at least one processor, cause the system to perform:
    determining a set of interactive user interface (UI) elements, each interactive UI element associated with at least one of: a particular feedback or an entity;
    providing a media content item created by a first user associated with a computing device, the media content item including a subset of the set of interactive UI elements displayed through the computing device and selected by the first user, wherein placement or appearance of the subset of the set of interactive UI elements over the media content as displayed through the computing device is determined by the first user, wherein the media content item including the subset of the set of interactive UI elements is published on a social networking system by the first user; and
    obtaining a selection of at least one interactive UI element in the subset in the media content item by a second user via the social networking system.

12. The system of claim 11, wherein the set of interactive UI elements is associated with one or more of: emojis, images, or animations.

13. The system of claim 11, wherein an interactive UI element includes one or more of: a button, a link, a tab, an image, or an icon.

14. The system of claim 11, wherein the instructions further cause the system to perform obtaining feedback associated with the media content item from the second user, wherein the feedback is indicated by the at least one interactive UI element in the subset selected by the second user.

15. The system of claim 11, wherein the instructions further cause the system to perform executing an action associated with the at least one interactive UI element in the subset selected by the second user, wherein the at least one interactive UI element is associated with an entity.

16. A non-transitory computer readable medium including instructions that, when executed by at least one hardware processor of a computing system, cause the computing system to perform a method comprising:
   determining a set of interactive user interface (UI) elements, each interactive UI element associated with at least one of: a particular feedback or an entity;
   providing a media content item created by a first user associated with a computing device, the media content item including a subset of the set of interactive UI elements displayed through the computing device and selected by the first user, wherein placement or appearance of the subset of the set of interactive UI elements over the media content as displayed through the computing device is determined by the first user, wherein the media content item including the subset of the set of interactive UI elements is published on a social networking system by the first user; and
   obtaining a selection of at least one interactive UI element in the subset in the media content item by a second user via the social networking system.

17. The non-transitory computer readable medium of claim 16, wherein the set of interactive UI elements is associated with one or more of: emojis, images, or animations.

18. The non-transitory computer readable medium of claim 16, wherein an interactive UI element includes one or more of: a button, a link, a tab, an image, or an icon.

19. The non-transitory computer readable medium of claim 16, wherein the method further comprises obtaining feedback associated with the media content item from the second user, wherein the feedback is indicated by the at least one interactive UI element in the subset selected by the second user.

20. The non-transitory computer readable medium of claim 16, wherein the method further comprises executing an action associated with the at least one interactive UI element in the subset selected by the second user, wherein the at least one interactive UI element is associated with an entity.

* * * * *